(12) United States Patent
Sarkar et al.

(10) Patent No.: US 11,416,284 B2
(45) Date of Patent: Aug. 16, 2022

(54) METHOD AND SYSTEM FOR MANAGING CONTINUOUS EXECUTION OF AN ACTIVITY DURING A USER DEVICE SWITCHOVER

(71) Applicant: Wipro Limited, Bangalore (IN)

(72) Inventors: Arnik Sarkar, Murshidabad (IN); Pranab Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 317 days.

(21) Appl. No.: 16/833,691

(22) Filed: Mar. 30, 2020

(65) Prior Publication Data
US 2021/0255893 A1    Aug. 19, 2021

(30) Foreign Application Priority Data
Feb. 14, 2020    (IN) .............................. 202041006600

(51) Int. Cl.
| | | |
|---|---|---|
| G06F 9/48 | (2006.01) | |
| G06F 9/445 | (2018.01) | |
| G06K 9/62 | (2022.01) | |
| G06F 9/54 | (2006.01) | |
| G06F 9/451 | (2018.01) | |

(52) U.S. Cl.
CPC ........ *G06F 9/4856* (2013.01); *G06F 9/44505* (2013.01); *G06F 9/451* (2018.02); *G06F 9/542* (2013.01); *G06K 9/6256* (2013.01)

(58) Field of Classification Search
CPC .................................................. G06F 9/4856
See application file for complete search history.

(56) References Cited

U.S. PATENT DOCUMENTS

| | | |
|---|---|---|
| 6,732,080 B1 | 5/2004 | Blants |
| 7,181,441 B2 | 2/2007 | Mandato et al. |

(Continued)

OTHER PUBLICATIONS

Blackstock, Michael, Rodger Lea, and Charles Krasic. "Evaluation and analysis of a common model for ubiquitous systems interoperability." International Conference on Pervasive Computing. Springer, Berlin, Heidelberg, 2008. (Year: 2008).*

(Continued)

*Primary Examiner* — Charlie Sun
(74) *Attorney, Agent, or Firm* — Finnegan, Henderson, Farabow, Garrett & Dunner, LLP

(57) ABSTRACT

A method and activity continuation system for managing continuous execution of an activity during a user device switchover is disclosed. The method includes detecting a switchover from a first user device to a second user device, where one or more activities are being executed in the first user device during the switchover. On detecting the switchover, the method includes determining device data and user related data associated with the second user device and applications data associated with one or more activities operated at the first user device. Further, based on the device data, the user related data and the applications data, contextual information is generated for the one or more activities. Thereafter, the method includes managing continuous execution of the one or more activities in the second user device on switchover based on the contextual information. Thus, the present disclosure facilitates users in providing application session continuity while switching between user devices.

18 Claims, 5 Drawing Sheets

(56) References Cited

U.S. PATENT DOCUMENTS

| | | |
|---|---|---|
| 7,233,933 B2 | 6/2007 | Horvitz et al. |
| 7,962,575 B2 | 6/2011 | Glatt et al. |
| 8,086,478 B2 | 12/2011 | Chen et al. |
| 8,578,418 B2 | 11/2013 | Levy et al. |
| 8,725,570 B2 | 5/2014 | Doughty et al. |
| 9,037,173 B2 | 5/2015 | Vargas et al. |
| 9,177,029 B1 | 11/2015 | Chau et al. |

OTHER PUBLICATIONS

Newman, Mark W., Arne Elliott, and Trevor F. Smith. "Providing an integrated user experience of networked media, devices, and services through end-user composition." International Conference on Pervasive Computing. Springer, Berlin, Heidelberg, 2008. (Year: 2008).*

* cited by examiner

METHOD AND SYSTEM FOR MANAGING CONTINUOUS EXECUTION OF AN ACTIVITY DURING A USER DEVICE SWITCHOVER

TECHNICAL FIELD

The present subject matter is related in general to computing systems and switchover operations, more particularly, but not exclusively to method and system for managing continuous execution of an activity during user device switchover.

BACKGROUND

In this connected world a user is always connected with the world through different personal user devices such as mobile, personal computer, smart car, smart-home controller, etc. With advancement in technology, the above user devices are capable of supporting user activities such as shopping, banking, socializing, or any other personal/professional work. The use of such personal user devices by a user is driven by nature of user activities and engagements at a given moment. For example, a user's use of smart-phone gets restricted while driving his/her car. In another example, use of office laptop may be restricted at home due to security or connectivity issues. Thus, for a user to have a better experience while switching from one device to the other, it would be necessary to provide an uninterrupted service for current activities performed across devices.

Nowadays users are always connected through different devices such as tab, computer/laptop, smart car infotainment system or smart home application devices, where users generally access different devices at different time of the day for performing different activities, such as, listening to music, watching videos, movies, reading articles, news, online shopping, travel booking, socializing etc., as per his/her requirement, mood and the like. However, for having a better user experience it would be necessary to provide the users an uninterrupted usage of applications continuity across devices.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for managing continuous execution of an activity during a user device switchover. The method comprises detecting a switchover from a first user device to a second user device, where one or more activities are being executed in the first user device during the switchover. The method includes determining device data and user related data associated with the second user device and applications data associated with one or more activities operated at the first user device. Based on the device data, the user related data and the applications data, contextual information is generated for the one or more activities. Thereafter, continuous execution of the one or more activities is managed in the second user device on switchover based on the contextual information.

In an embodiment, the present disclosure may relate to an activity continuation system for managing continuous execution of an activity during a user device switchover. The activity continuation system may comprise a processor and a memory communicatively coupled to the processor, where the memory stores processor executable instructions, which, on execution, may cause the activity continuation system to detect a switchover from a first user device to a second user device, where one or more activities are being executed in the first user device during the switchover. The activity continuation system determines device data and user related data associated with the second user device and applications data associated with one or more activities operated at the first user device. Based on the device data, the user related data and the applications data, the activity continuation system generates contextual information the one or more activities. Thereafter, the activity continuation system manages the continuous execution of the one or more activities in the second user device on switchover based on the contextual information.

In an embodiment, the present disclosure relates to a non-transitory computer readable medium including instructions stored thereon that when processed by at least one processor may cause an activity continuation system to detect a switchover from a first user device to a second user device, where one or more activities are being executed in the first user device during the switchover. The instruction causes the processor to determine device data and user related data associated with the second user device and applications data associated with one or more activities operated at the first user device. Based on the device data, the user related data and the applications data, the instruction causes the processor to generate contextual information the one or more activities. Thereafter, the instruction causes the processor to manage the continuous execution of the one or more activities in the second user device on switchover based on the contextual information The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
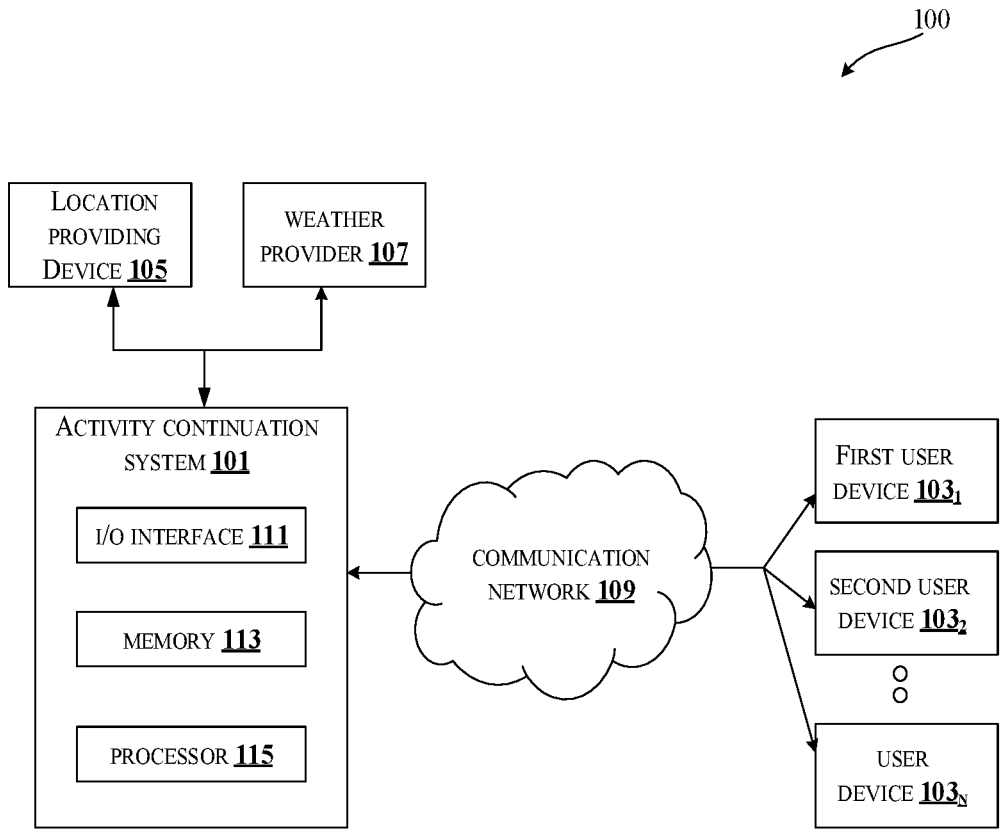
FIG. 1a illustrates an exemplary environment for managing continuous execution of an activity during a user device switchover in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and activity continuation system for managing continuous execution of an activity during a user device switchover. Existing systems in application management possess problem of keeping track of preferred application-device combinations for a user, and to provide the user with most suitable application usage option in context when the user switches to another user device. Thus, such systems do not alleviate user experience and management of different applications in different user devices. The present disclosure resolves this problem by generating contextual information for one or more activities associated with the user. The present disclosure detects a switchover of user devices, wherein the one or more activities are being executed in a first user device during the switchover. The contextual information is generated based on device, user and application data associated with the user devices. Continuous execution of the one or more activities is managed on a second user device upon switchover based on the contextual information. Thus, the present disclosure facilitates in providing application session continuity while switching between user devices.

FIG. 1a illustrates an exemplary environment for managing continuous execution of an activity during a user device switchover in accordance with some embodiments of the present disclosure.

As shown in FIG. 1, an environment 100 includes an activity continuation system 101 connected through a communication network 109 to a first user device $103_1$, a second user device $103_2$, up to an Nth user device $103_N$ (collectively referred as user devices 103). The communication network 109 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. In an embodiment, the user devices 103 may refer to computing devices in which a user may perform one or more activities. The one or more activities may include listening to music, writing emails, watching videos, movies, reading articles, news, online shopping, travel booking, socializing and the like. The user devices 103 may include, but is not limited to, a laptop, a desktop computer, a notebook, a smartphone, IOT devices, smart car infotainment system or smart home application devices, a tablet, a server, and any other computing devices. A person skilled in the art would understand that, any other devices, not mentioned explicitly, may also be used as the user devices 103 in the present disclosure.

Figure 1B:
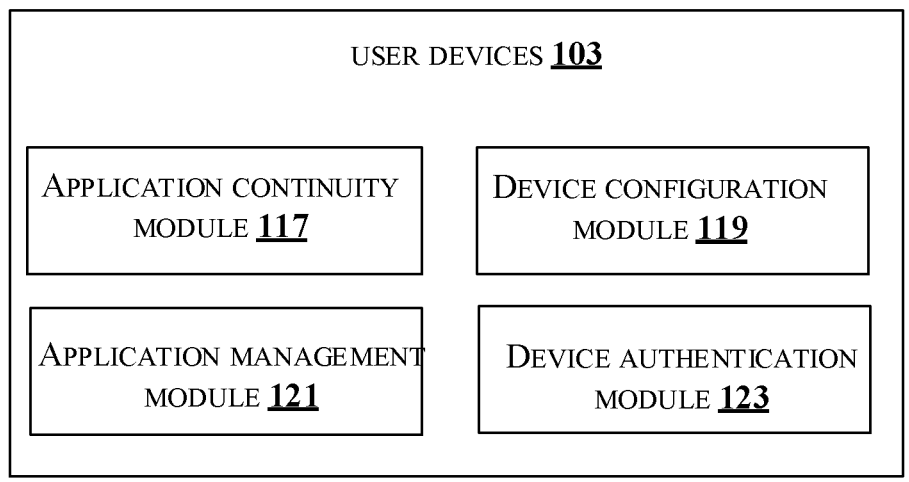
FIG. 1b shows an exemplary block diagram of a user device in accordance with some embodiments of the present disclosure.

FIG. 1b shows an exemplary block diagram of a user device in accordance with some embodiments of the present disclosure. As shown in FIG. 1b, the user devices 103 may include an application continuity module 117, a device configuration module 119, an application management module 121 and a device authentication module 123. The application continuity module 117 maintains application session information on respective user devices 103 and synchronize user device details, user routine details, application profiles and associated session information for respective user devices 103 with the activity continuation system 101. The device configuration module 119 maintains user device configuration information and maintains updates user used devices. The application management module 121 maintains user device application information and update on last used user applications. The device authentication module 123 maintains user profiles. The user devices 103 and functionalities of each module is explained in detail in later part of the disclosure.

Returning to FIG. 1a, the activity continuation system 101 is connected to a location providing device 105 and a weather provider 107 through a communication network (not shown explicitly in FIG. 1a). The location providing device 105 maintains map information. This location providing device 105 may receive location coordinates from the activity continuation system 101 and in receipt provides map related information such as, location Id, traffic condition and the like. The weather provider 107 may provide current weather information based on location coordinates of the user.

The activity continuation system 101 manages continuous execution of an activity during a user device switchover. In one embodiment, the activity continuation system 101 may include, but is not limited to, a laptop, a desktop computer, a Personal Digital Assistant (PDA), a notebook, a smartphone, IOT devices, a tablet, a server, and any other computing devices. A person skilled in the art would understand that, any other devices, not mentioned explicitly, may also be used as the activity continuation system 101 in the present disclosure. Further, the activity continuation system 101 may include an I/O interface 111, a memory 113 and a processor 115. The I/interface 111 may be configured to receive data from the user devices 103 and from the location providing device 105 and the weather provider 107. The data from the I/O interface 111 may be stored in the memory 113. The memory 113 may be communicatively coupled to the processor 115 of the activity continuation system 101. The memory 113 may also store processor instructions which may cause the processor 115 to execute the instructions for managing continuous execution of the activity during user device switchover in the activity continuation system 101.

The user may switch user devices 103 depending on different situation. While switching by the user, the activity continuation system 101 may detect the switchover from a first user device $103_1$ to a second user device $103_2$. In an embodiment, the activity continuation system 101 may detect the switchover based on a request received either from the first user device $103_1$ or from the second user device $103_2$. Particularly, the activity continuation system 101 validates the request by verifying user details and device information of the user device based on the request with corresponding stored data. On a successful validation, the activity continuation system 101 may initiate a selective synchronization of applications in the second user device $103_2$. The selective synchronization is explained in FIG. 3 below. In one possibility, during the switchover one or more activities are being executed by the user in the first user device $103_1$. In such case, upon detecting the switchover, the activity continuation system 101 may determine device data and user data associated with the second user device $103_2$ and applications data associated with the one or more activities operated at the first user device $103_1$.

The device data may include, for example, device identification number, device type and supported application identification number. The user related data may include current user information such as, user identification number, date, time, location associated with the second user device $103_2$, weather condition and traffic condition. The applications data may include application identifier application type, application state and application restriction. Further, the activity continuation system 101 may generate contextual information for the one or more activities based on the device data, the application data and the user related data. In an embodiment, the contextual information may be related to the user considering the device data, the user related data and the application data.

Thus, based on the contextual information, the activity continuation system 101 may check similarities between applications of the first user device $103_1$, used for execution of the one or more activities with applications of the second user device $103_2$. Thus, on identifying similarities, the activity continuation system 101 may manages the continuous execution of the one or more activities in the second user device $103_2$ by automatically launching one or more second applications in the second user device $103_2$ with latest used state of each activities, such that the one or more second applications is same as one or more first applications executing the one or more activities at the first user device $103_1$. Alternatively, if no similar applications are identified, the activity continuation system 101 manages the continuous execution of the one or more activities in the second user device $103_2$ by identifying one or more supported applications in the second user device $103_2$ which may be preferred by users to be used in a particular context.

The activity continuation system 101 may identify the one or more supported applications on a predefined model trained using historic user context data and threshold values associated with user preferences. In an embodiment, a list of the identified one or more supported applications may be provided for user selection upon switchover. In view of the list, the activity continuation system 101 may receive a response by the user which may either be accepting at least one supporting application from the list or rejecting the list of the one or more supported applications. In an embodiment, if the list is rejected, the activity continuation system 101 may update the predefined model by making one or more changes in the predefined model and threshold values based on the response. In an embodiment, the activity continuation system 101 may alert the user about a conflict between one or more activities associated with the user. For example, consider a user may typically perform a specific activity regularly using a specific application-device combination at a specific time period of day. However, on a particular day, the user scheduled a different activity at same interval overlapping with the regular/routine activity. In such case, the activity continuation system 101 may alert the user about the conflict in the one or more activities.

Figure 2:
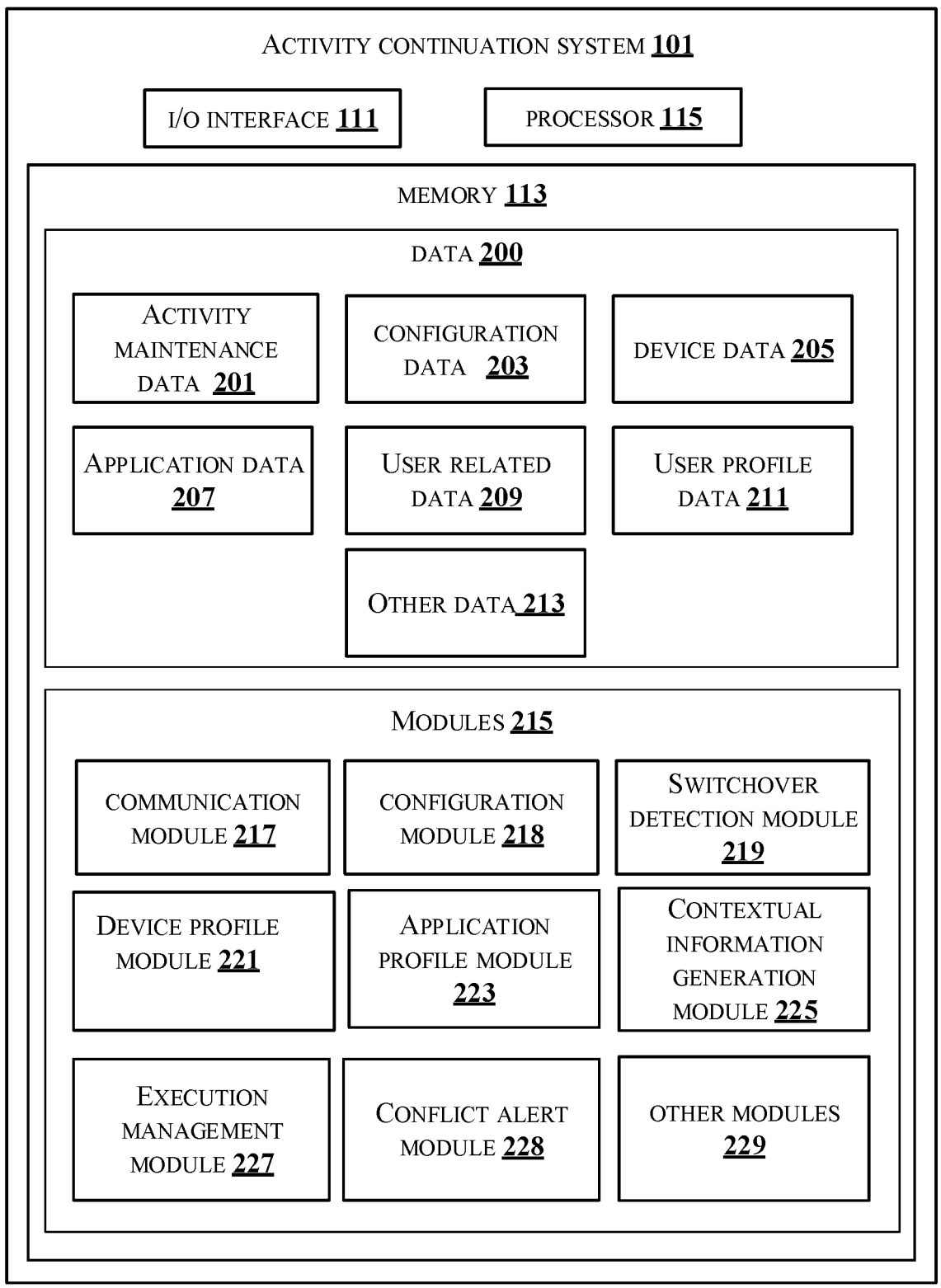
FIG. 2 shows a detailed block diagram of an activity continuation system in accordance with some embodiments of the present disclosure.

FIG. 2 shows a detailed block diagram of an activity continuation system in accordance with some embodiments of the present disclosure.

The activity continuation system 101 may include data 200 and one or more modules 215 which are described herein in detail. In an embodiment, data 200 may be stored within the memory 113. The data 200 may include, for example, activity maintenance data 201, configuration data 203, device data 205, application data 207, user related data 209, user profile data 211 and other data 213.

The activity maintenance data 201 may include activity information associated with the one or more applications in the user devices 103. Particularly, the information may include information of the one or more applications being executed on the user devices 103 along with respective states. Further, the activity maintenance data 201 may include application session information.

The configuration data 203 may include configuration information associated with the user devices 103. The configuration data 203 may contain a list of registered users and user devices 103. In an embodiment, the list is updated when a new user device is registered.

The device data 205 may include device configuration information such as, device identification number, device type and supported application identification number and the like.

The application data 207 may include user used application details such as, comprises application identifier application type, application state and application restriction.

The user related data 209 may include registered user information such as user identification number, date, time, location associated with the user devices 103, weather condition and traffic condition.

The user profile data 211 may include user profile information. Particularly, the user profile data 211 may include user identification information which contains user login data.

The other data 213 may store data, including temporary data and temporary files, generated by modules 215 for performing the various functions of the activity continuation system 101.

In an embodiment, the data 200 in the memory 113 are processed by the one or more modules 215 present within the memory 113 of the activity continuation system 101. In an embodiment, the one or more modules 215 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 215 may be communicatively coupled to the processor 115 for performing one or more functions of the activity continuation system 101. The said modules 215 when configured with the functionality defined in the present disclosure will result in a novel hardware.

In one implementation, the one or more modules 215 may include, but are not limited to a communication module 217, a switchover detection module 219, a device profile module 221, an application profile module 223, a contextual information generation module 225 and an execution management module 227. The one or more modules 215 may also include other modules 229 to perform various miscellaneous functionalities of the activity continuation system 101. In an embodiment, the other modules 229 may include a user profile module, a user activity collector and a training module.

The user profile module maintains user profile information. The user profile module may maintain two repositories namely, User Identification Profile (UIP) and User Activity Profile (UAP). The UIP may contain the user login data which is utilised by the user profile module for verifying the credentials of the users. The UAP may contain the user activity information such as, application information along with corresponding last state details. For a single user, multiple used devices may exist with different used applications with respective last state. The user activity collector maintains user activity information. The user activity collector collects user activity for all user devices with along with application details and respective states. The training module may train the predefined model using historic user context data and threshold values associated with user preferences.

The communication module 217 may receive and maintain communication from the user devices 103 and the location providing device 105 and the weather provider 107.

Figure 3:
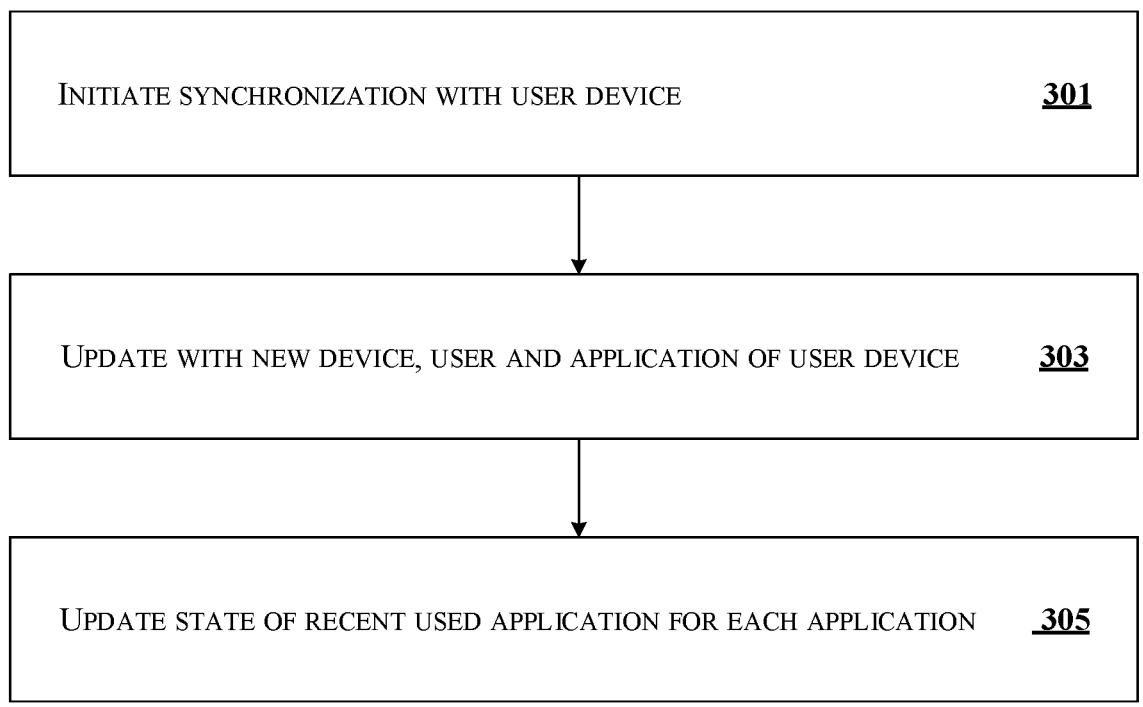
FIG. 3 shows an exemplary flowchart showing a method for synchronizing user device and activity continuation system in accordance with some embodiments of the present disclosure.

The configuration module 218 may maintain device configuration information. The configuration module 218 may register any new user or user device or any new user application and store a list of registered users. Further, the configuration module 218 may update existing user devices, existing user applications and validates user credentials of existing users. Further, the configuration module 218 may initialize the activity continuation system 101 every time post switching ON. In order to initialise, the configuration module 218 may load the list of registered devices and send a selective multicast "device-discovery" request for the registered devices. On receipt of an acknowledgement from each active registered user device, the configuration module 218 may launch initial-synchronization as server-initiated-sync-up for relevant active user devices. FIG. 3 shows an exemplary flowchart showing a method for synchronizing user device and activity continuation system in accordance with some embodiments of the present disclosure.

As shown in FIG. 3, at block 301, the configuration module 218 may initialise synchronization with the active user device by checking types of synchronization request. In case the type is "device-initiated-sync-up", an acknowledgement receipt is provided to the user device. In an embodiment, on receipt of the acknowledgment, the user device may create a sync-up message (SYNCM) and the method moves to block 303. However, in case the type is "server-initiated-sync-up", the synchronization request is provided to the user device which may create a sync-up message and the method moves to block 303.

At block 303, the configuration module 218 may update the device, user and application details. Particularly, the user device may create a message synch-up message (SYNCM) based on combination of device, user and application information and determines difference between the SYNCM with last shared SYNCM. In case of a difference, the created synch-up message SYNCM is provided to the configuration module 218 for update.

At block 305, the configuration module 218 may update recent used application in the user devices 103. Particularly, the configuration module 218 may identify supported user identification profiles for the user device for which the sync-up request is received and determines current state for each supported application for update.

Returning to FIG. 2, the switchover detection module 219 may detect a switchover from the first user device $103_1$ to the second user device $103_2$. In an embodiment, the switchover may be detected either from the first user device $103_1$ or the second user device $103_2$. In an embodiment, the switchover may be detected based on an authentication request received either from the first user device $103_1$ or the second user device $103_2$. In an embodiment, during the switchover, the one or more activities may be executed in the first user device $103_1$.

The device profile module 221 may determine the device data associated with the second user device $103_2$ based on the request. The device data may include, but not limited to, device identification number, device type and supported application identification number and the like.

The application profile module 223 may determine the user related data and application data associated with the one or more activities operated at the first user device $103_1$. In an embodiment, a last used application IP (LUAIP) is determined for the user associated with the request. The application profile module 223 utilizes the LUAIP to retrieve last used application Ids (LUAI) and application Type (LUAT). Thus, the application profile module 223 may determine the application data as, the application identifier, the application type, application state and application restriction.

The contextual information generation module 225 may generate the contextual information for the one or more activities based on the device data, the user related data and the application data. In an embodiment, the contextual information is determined by combining the user related data, device data and application data. For example, consider a user is using personal computer for writing an email in Outlook™ application. Since the user is catching a bus to office, the user may save email draft in-between and starts for office. While travelling in the bus, the user may complete the draft email in mobile phone. In such case, the user switches from personal computer to mobile phone. In this case, user context may include, time, day, location, traffic condition in which the mobile phone is used, and the application data may include the application id of Outlook™ application and application type as email application. Further, the device data may include the device id which is cell Phone and device type as portable device.

The execution management module 227 may manage the continuous execution of the one or more activities in the second user device $103_2$ on switchover based on the contextual information. In an embodiment, on receiving the contextual information, the execution management module 227 may check similarities between applications of the first user device $103_1$, used for execution of the one or more activities with applications of the second user device $103_2$. The similarities are identified by checking if the last used application Ids (LUAI) identified by the application profile module 223 may be used in the second user device $103_2$.

On identifying similarities, the execution management module 227 may manages the continuous execution of the one or more activities in the second user device $103_2$ by automatically launching one or more second applications in the second user device $103_2$ with latest state of each activities, such that the one or more second applications is same as one or more first applications executing the one or more activities at the first user device $103_1$. For example, consider a scenario where the user is using device A and working on "application 1" and requires to switch to a device B.

In such case, the execution management module 227 may check for similar applications as the "application 1" in device B. On identifying similar application (say application 2), the execution management module 227 manages the continuous execution of an activity in the device B by automatically launching the application 2 in the device B with latest state of the activity. Thus, in such case, the user may avoid unnecessary steps of sign-in to device B, start a new session and restart last activity from the beginning after opening the application 1 in the device B (if Application 1 is available in device B, else find another suitable application to continue the activity). However, in case no similar applications are identified, the execution management module 227 may manage the continuous execution of the one or more activities in the second user device $103_2$ by identifying one or more supported applications in the second user device $103_2$ based on user preferences corresponding to the given context.

In an embodiment, the one or more supported applications may refer to application which may be preferred by users to be used in a particular context. The execution management module 227 may identify the one or more supported applications using the predefined model. In an embodiment, the list of the identified one or more supported applications may be provided for user selection upon switchover. In case the user accepts at least one supported application from the list, the execution management module 227 may launch the selected application from the last state of the application based on the first user device $103i$. For example, consider a scenario where the user is using the device B and working on application 2 and require to switch to a device C. At current time (say evening), the user generally uses the device C and use application 3 to watch news or use application 4 to watch entertainment program as per mood. So, while switching from the device B to the device C, the user may want to continue latest ongoing activity in device B using application 2 or may want to use application 3 to watch news or may want to use application 4 to watch entertainment program. Consider that a similar application as application 2 is not present in device C. In such case, the execution management module 227 may identify one or more supported applications in the device C similar to the application 2 of device B.

The conflict alert module 228 may monitor the one or more applications in the user devices 103. In case the user tries to schedule an activity, the conflict alert module 228 may check details of user schedule and may provide an alert to the user about a conflict between one or more activities associated with the user. The conflict alert module 228 checks the details of user schedule for all the user devices 103 based on one or more user activities associated with the user.

Exemplary Scenarios:

Consider a user is using personal computer for listening news on YouTube™ application. Since the user is catching a train, the user may start travelling. While travelling in the train, the user may continue listening to the news in mobile phone. In such case, the user is switching from personal computer to mobile phone. In this case, user context may include, time, day, location, network condition in which the mobile phone is used, and the application data may include the application id of YouTube™ application and application type as media. Further, the device data may include the device id which is cell phone and device type as portable device. In case the YouTube™ application is present in the cell phone, the activity continuation system 101 may launch the media/news in the cell phone. However, in case YouTube™ application is not present in cell phone, the activity continuation system 101 may identify similar applications in the cell phone. In this case, suppose the activity continuation system 101 identify Dailymotion™ application as similar supporting application. Thus, the activity continuation system 101 may launch the Dailymotion™ application based on user preference for continuous execution of news for the user.

Figure 4:
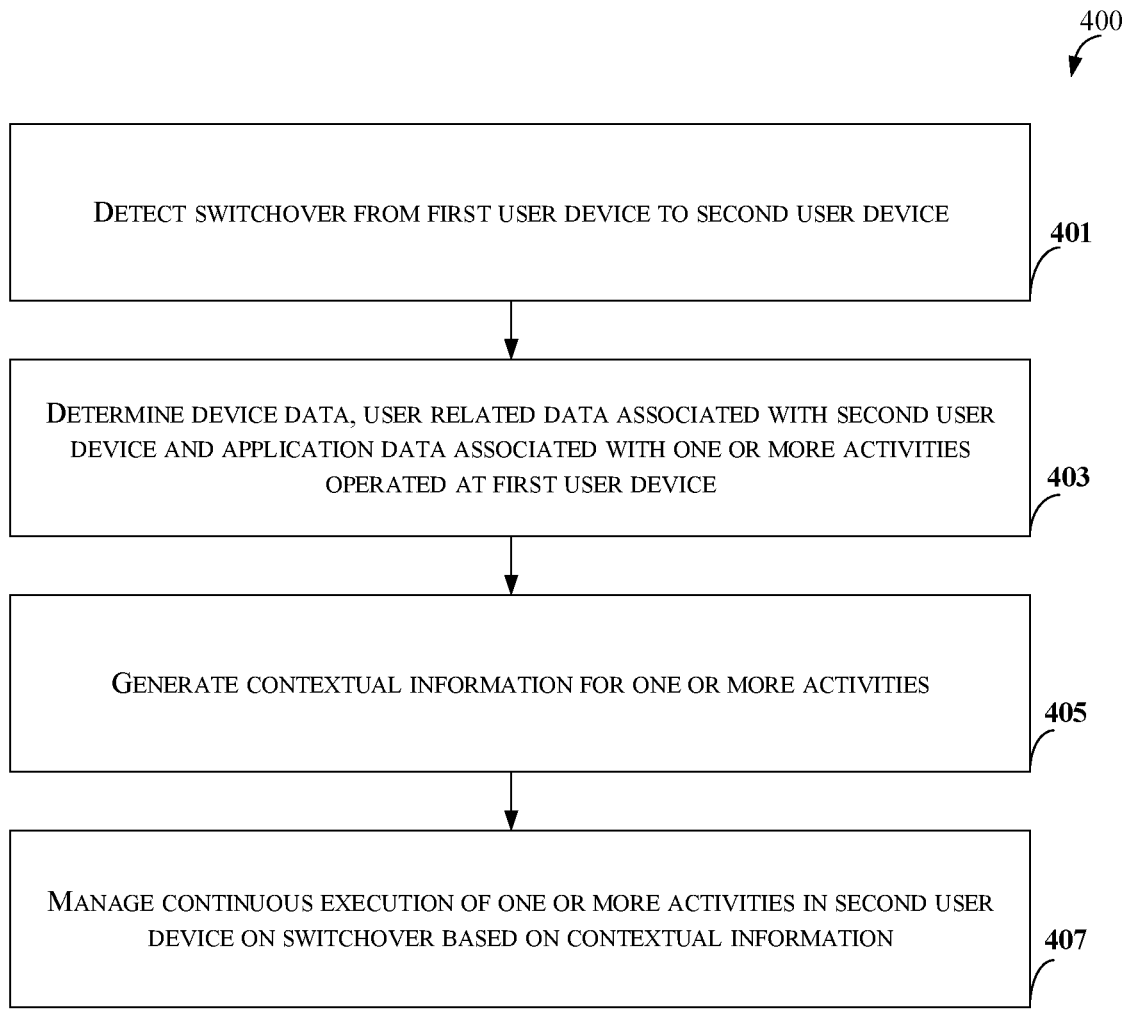
FIG. 4 illustrates a flowchart showing a method for managing continuous execution of an activity during a user device switchover in accordance with some embodiments of present disclosure.

FIG. 4 illustrates a flowchart showing a method for managing continuous execution of an activity during a user device switchover in accordance with some embodiments of present disclosure.

As illustrated in FIG. 4, the method 400 includes one or more blocks for managing continuous execution of an activity during a user device switchover. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the switchover from the first user device $103_1$ to the second user device $103_2$ is detected by the switchover detection module 219. During the switchover, the one or more activities are being executed in the first user device $103_1$.

At block 403 the device data is determined by the device profile module 221 and the user related data associated with the second user device $103_2$ and the applications data associated with the one or more activities are determined by the application profile module 223.

At block 405, the contextual information for the one or more activities is generated by the contextual information generation module 225 based on the device data, the user related data and the application data.

At block 407, the continuous execution of the one or more activities is managed by the execution management module 227 in the second user device 103$_2$ on switchover based on the contextual information.

Figure 5:
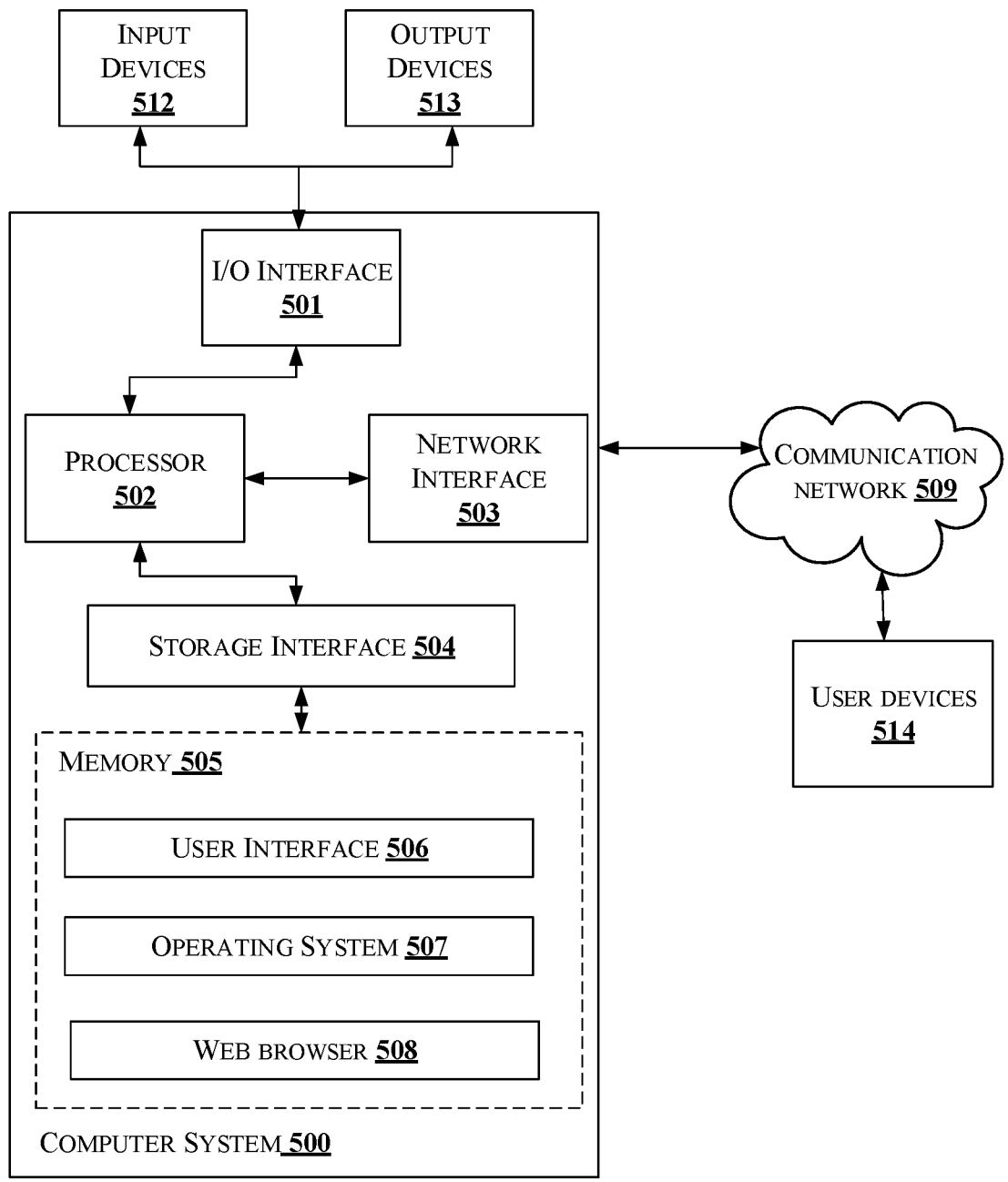
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the activity continuation system. The computer system 500 may include a central processing unit ("CPU" or "processor") 502. The processor 502 may include at least one data processor for of managing continuous execution of an activity during a user device switchover. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 613 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the activity continuation system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with user devices 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Ft and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure facilitates users in providing application session continuity while switching between user devices.

An embodiment of the present disclosure improves user experience by providing options for a set of user preferred activities that user may like to do after device switching.

An embodiment of the present disclosure helps users by alerting on schedule conflicts when user schedules an unusual task in place of routine activity.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Environment |
| 101 | Activity continuation system |
| 103 | User devices |
| 105 | Location providing device |
| 107 | Weather provider |
| 109 | Communication network |
| 111 | I/O interface |
| 113 | Memory |
| 115 | Processor |
| 117 | Application continuity module |
| 119 | Device configuration module |
| 121 | Application management module |
| 123 | Device authentication module |
| 200 | Data |
| 201 | Activity maintenance data |
| 203 | Configuration data |
| 205 | Device data |
| 207 | Application data |
| 209 | User related data |
| 211 | User profile data |
| 213 | Other data |
| 215 | Modules |
| 217 | Communication module |
| 218 | Configuration module |
| 219 | Switchover detection module |
| 221 | Device profile module |
| 223 | Application profile module |
| 225 | Contextual information generation module |
| 227 | Execution management module |
| 228 | Conflict alert module |
| 229 | Other modules |

What is claimed is:

1. A method of managing continuous execution of an activity during a user device switchover, the method comprising:
    detecting, by an activity continuation system, a switchover from a first user device to a second user device, wherein one or more activities are being executed in the first user device during the switchover;
    determining, by the activity continuation system, device data and user data associated with the second user device and applications data associated with one or more activities operated at the first user device;
    generating, by the activity continuation system, contextual information for the one or more activities based on the device data, the user related data and the applications data; and
    managing, by the activity continuation system, continuous execution of the one or more activities in the second user device on switchover based on the contextual information.

2. The method as claimed in claim 1, wherein the device data comprises device identification number, device type and supported application identification number and the user related data comprises current user information such as user identification number, date, time, location associated with the second user device, weather condition and traffic condition and the applications data comprises application identifier application type, application state and application restriction.

3. The method as claimed in claim 1, wherein managing the continuous execution of the one or more activities in the second user device comprises:
    automatically launching latest state of one or more second applications in the second user device, wherein the one or more second application is same as one or more first applications executing the one or more activities at the first user device, wherein the one or more second applications in the second user device is identified based on the contextual information; or
    identifying one or more supported applications in the second user device based on user preferences corresponding to the contextual information, upon identifying absence of the one or more second applications required for the execution of the one or more activities in the second user device.

4. The method as claimed in claim 3, wherein the one or more supported applications in the second user device is identified based on a predefined model trained using historic user context data and threshold values associated with user preferences.

5. The method as claimed in claim 4, further comprising providing a list of the one or more supported applications for user selection upon switchover, and receiving a response to the user selection, wherein the response includes one of accepting the at least one supporting application from the list of the one or more supported applications and rejecting the list of the one or more supported applications.

6. The method as claimed in claim 1, further comprising alerting the user about a conflict between one or more routine activities identified for the user based on the contextual information.

7. An activity continuation system for managing continuous execution of an activity during a user device switchover, comprising:
    a processor; and
    a memory communicatively coupled to the processor, wherein the memory stores processor instructions, which, on execution, causes the processor to:
    detect a switchover from a first user device to a second user device, wherein one or more activities are being executed in the first user device during the switchover;
    determine device data and user data associated with the second user device and applications data associated with one or more activities operated at the first user device;
    generate contextual information for the one or more activities based on the device data, the user related data and the applications data; and
    manage continuous execution of the one or more activities in the second user device on switchover based on the contextual information.

8. The activity continuation system as claimed in claim 1, wherein the device data comprises device identification number, device type and supported application identification number and the user related data comprises current user information such as user identification number, date, time, location associated with the second user device, weather condition and traffic condition and the applications data comprises application identifier application type, application state and application restriction.

9. The activity continuation system as claimed in claim 1, wherein the processor manages the continuous execution of the one or more activities by:
    automatically launching latest state of one or more second applications in the second user device, wherein the one or more second application is same as one or more first applications executing the one or more activities at the first user device, wherein the one or more second applications in the second user device is identified based on the contextual information; or identifying one or more supported applications in the second user device ($103_2$) based on user preferences corresponding to the contextual information, upon identifying absence of the one or more second applications required for the execution of the one or more activities in the second user device.

10. The activity continuation system as claimed in claim 9, wherein the processor identifies the one or more supported applications in the second user device based on a predefined model trained using historic user context data and threshold values associated with user preferences.

11. The activity continuation system as claimed in claim 10, wherein the processor provides a list of the one or more supported applications for user selection upon switchover, and receives a response to the user selection, wherein the response includes one of accepting the at least one supporting application from the list of the one or more supported applications and rejecting the list of the one or more supported applications.

12. The activity continuation system as claimed in claim 7, wherein the processor alerts the user about a conflict between one or more routine activities identified for the user based on the contextual information.

13. A non-transitory computer readable medium including instruction stored thereon that when processed by at least one processor cause an activity continuation system to perform operation comprising:

detecting a switchover from a first user device to a second user device, wherein one or more activities are being executed in the first user device during the switchover;

determining device data and user data associated with the second user device and applications data associated with one or more activities operated at the first user device;

generating contextual information for the one or more activities based on the device data, the user related data and the applications data; and managing continuous execution of the one or more activities in the second user device on switchover based on the contextual information.

14. The medium as claimed in claim 13, wherein the device data comprises device identification number, device type and supported application identification number and the user related data comprises current user information such as user identification number, date, time, location associated with the second user device, weather condition and traffic condition and the applications data comprises application identifier application type, application state and application restriction.

15. The medium as claimed in claim 13, wherein the instruction causes the processor to manage the continuous execution of the one or more activities in the second user device by:

automatically launching latest state of one or more second applications in the second user device, wherein the one or more second application is same as one or more first applications executing the one or more activities at the first user device, wherein the one or more second applications in the second user device is identified based on the contextual information; or identifying one or more supported applications in the second user device based on user preferences corresponding to the contextual information, upon identifying absence of the one or more second applications required for the execution of the one or more activities in the second user device.

16. The medium as claimed in claim 15, wherein the instruction causes the processor to identify one or more supported applications in the second user device based on a predefined model trained using historic user context data and threshold values associated with user preferences.

17. The medium as claimed in claim 16, wherein the instruction causes the processor to provide a list of the one or more supported applications for user selection upon switchover, and receive a response to the user selection, wherein the response includes one of accepting the at least one supporting application from the list of the one or more supported applications and rejecting the list of the one or more supported applications.

18. The medium as claimed in claim 13, wherein the instruction causes the processor to alert the user about a conflict between one or more routine activities identified for the user based on the contextual information.

\* \* \* \* \*